US005654697A

United States Patent [19]

Uchida

[11] Patent Number: 5,654,697

[45] Date of Patent: Aug. 5, 1997

[54] PAGING RECEIVER EQUIPPED WITH A DISPLAY

[75] Inventor: Jun Uchida, Tokyo, Japan

[73] Assignee: NEC Corporation, Tokyo, Japan

[21] Appl. No.: 561,556

[22] Filed: Nov. 21, 1995

Related U.S. Application Data

[63] Continuation of Ser. No. 148,368, Nov. 8, 1993, abandoned.

[30] Foreign Application Priority Data

Nov. 12, 1992 [JP] Japan .................................... 4-302110

[51] Int. Cl.[6] ....................................................... H04Q 7/18

[52] U.S. Cl. ............................... 340/825.34; 340/825.44; 340/311.1; 455/32.1

[58] Field of Search ......................... 340/825.44, 825.47, 340/825.56, 309.4, 309.15, 311.1, 825.34; 455/32.1

[56] References Cited

U.S. PATENT DOCUMENTS

| | | | |
|---|---|---|---|
| 4,894,649 | 1/1990 | Davis | 340/825.44 |
| 5,025,252 | 6/1991 | DeLuca et al. | 340/825.44 |
| 5,140,702 | 8/1992 | Laflin | 340/825.44 X |
| 5,146,217 | 9/1992 | Holmes et al. | 340/825.31 |
| 5,225,826 | 7/1993 | DeLuca et al. | 340/825.44 |
| 5,430,439 | 7/1995 | Bodet et al. | 340/825.44 |
| 5,434,563 | 7/1995 | Kodoh | 340/825.44 |
| 5,448,228 | 9/1995 | Wagai et al. | 340/825.44 |
| 5,473,320 | 12/1995 | DeLuca et al. | 340/825.44 |
| 5,473,667 | 12/1995 | Neustein | 340/825.44 X |

FOREIGN PATENT DOCUMENTS

| | | |
|---|---|---|
| 43-26632 | 11/1992 | Japan . |
| 2240864 | 8/1991 | United Kingdom . |
| 89-06474 | 7/1989 | WIPO . |

*Primary Examiner*—Michael Horabik
*Assistant Examiner*—William H. Wilson, Jr.
*Attorney, Agent, or Firm*—Sughrue, Mion, Zinn, Macpeak & Seas

[57] ABSTRACT

In a paging receiver equipped with a display, said display informing a user, when a paging number involved in received data is coincident with a paging number allocated to itself, of that fact with a calling ringing sound and displaying a received message, an inherent password is previously set, and when a password involved in the received data is coincident with the inherent password, alarming and display of the message are allowed, while when both passwords are not coincident with each other, a prohibition time zone of the alarming and the display previously set, and when the operation time is within the previously set prohibition time zone, the alarming/display is allowed but when the same is out of the prohibition time zone, the alarming/display is prohibited. Further, when the prohibition time zone is completed, the alarming is effected and a message received within the prohibition time zone is displayed.

7 Claims, 2 Drawing Sheets

PAGING RECEIVER EQUIPPED WITH A DISPLAY

This is a Continuation of Application No. 08/148,368 filed Nov. 8, 1993 now abandoned.

BACKGROUND OF THE INVENTION

1. Field of the Invention

The present invention relates to a paging receiver equipped with a display for displaying a received message on a screen.

2. Description of the Prior Art

One of the recent technical innovations of pagers, is a function to display on a screen a message such as a telephone number of a calling party instead of a tone-only type which only informs a carrier of the pager of a received call by a ringing sound.

In conventional pagers with a display, information is received from all callers at all times without limitation.

Therefore, it is impossible to change the time period during which calls can be received. This makes it impossible to conveniently use the same pager, for business purposes within the working hours and personal purposes outside the working hours. Accordingly, a user of the pager may received a business call outside the working hours or if the pager is turned off to prevent a a business call from being received outside the working hours, a private call for the user is prevented from being received by the pager.

For solving the difficulty, the present applicant proposed one type of pager in Japanese Patent Laid-Open No. Hei 4-326632 wherein use is made of different informing means which are operable in different time zones. In accordance with this pager, there is employed in the working hours alarming means different from that used outside the working hours or use is made of a non-ringing sound so that proper differentiation is made between business calls and private calls. The pager however suffers from the additional problem of the carrier of the pager of the latter design is not informed of business calls outside the working hours.

SUMMARY OF THE INVENTION

It is therefore an object of the present invention to provide a paging receiver equipped with a display wherein proper use thereof in desired time zones is ensured without interruption of a power supply to the pager together with secure information transfer at all times.

In accordance with the paging receiver with the display of the present invention, only in the case where a preset specific password is involved in a received message, are alarm and display of a message allowed, and when the specific password is different from a password inherent to a user, the alarm and display are allowed only outside a set prohibition time zone while they are prohibited within the prohibition time zone.

The above and other objects, features, and advantages of the invention will become more apparent from the following description when taken in conjunction with the accompanying drawings.

DETAILED DESCRIPTION OF THE PREFERRED EMBODIMENT

In what follows, there will be described a preferred embodiment of a paging receiver with a display according to the present invention with reference to the accompanying drawings.

Figure 1:
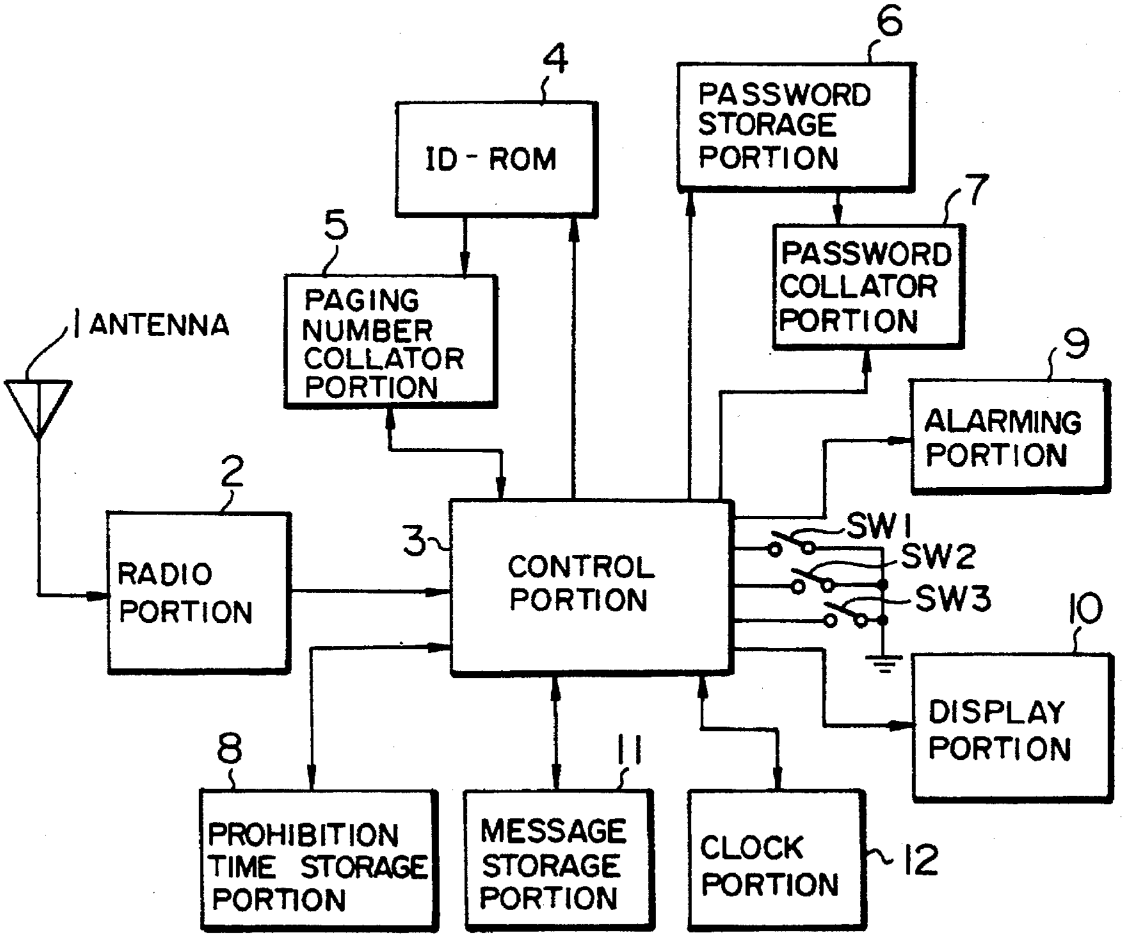
FIG. 1 is a block diagram illustrating a preferred embodiment of a display-equipped paging receiver according to the present invention.
Figure 3:
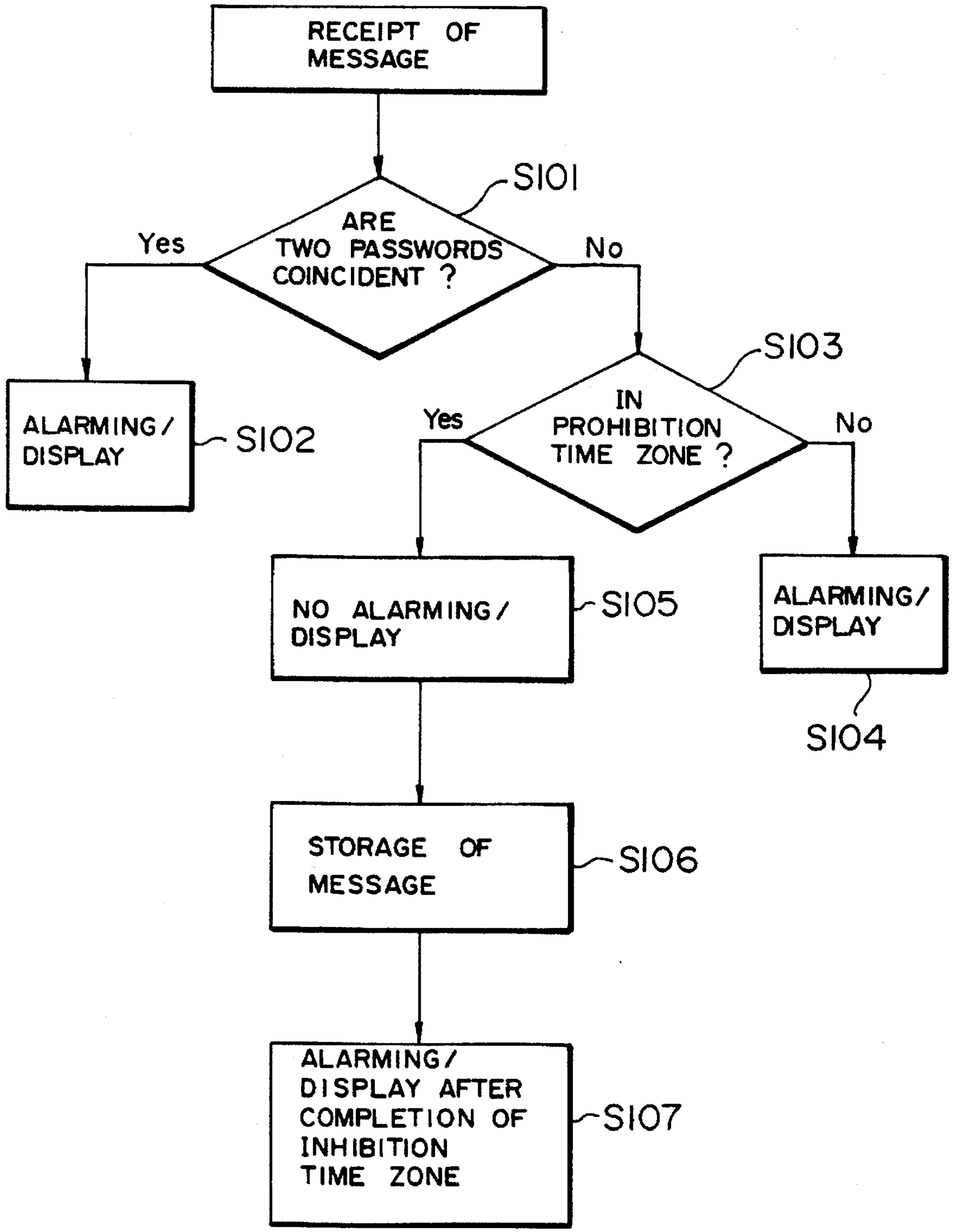
FIG. 3 is a flowchart illustrating a procedure of alarming operation of reception of a password in the present preferred embodiment.

Referring to FIGS. 1 and 3, there are illustrated a preferred embodiment of the present invention in the form of a block diagram and a procedure of alarm/display operation upon reception of a password in the present preferred embodiment in the form of a flowchart.

As illustrated in FIG. 1, a paging receiver with a display of the present embodiment is comprised of a radio portion 2 for demodulating a radio signal received through an antenna 1, an ID-ROM 4 for previously storing a paging number of the paging receiver, a paging number collator portion 5 for comparing and collating a paging number involved in a received radio signal and a paging number previously stored in the ID-ROM 4 with each other, a password storage portion 6 for previously storing a password for the paging receiver, a password collator portion 7 for comparing and collating a password involved in a received message and a stored password with each other, a prohibition time storage portion 8 for storing the commencement time and completion time of a time zone when alarming of a call and display of a message are prohibited, a clock portion 12 for generating a real time signal, a message storage portion 11 for storing a received message, an alarming portion 9 for generating a call signal for alarming, a display portion 10 for displaying a received message, and a control portion 3 for controlling the entire operation of the paging receiver. The paging receiver includes on an operating panel a mode switching button SW1, a scroll button SW2, and a setting button SW3 some of which are used to set the commencement time and completion time of the prohibition time zone. The aforementioned password may be entered with the operation of these buttons. The entered password can be confirmed by displaying it on the display portion 10.

Figure 2A:
FIG. 2A PRIOR ART
FIG. 2A illustrates a format of calling signals for a conventional paging receiver and FIG. 2B illustrates a format of calling signals for a paging receiver of the present invention.
Figure 2B:

Referring to FIGS. 2A and 2B, there are illustrated formats of call signals for the paging receivers.

FIG. 2A illustrates the format of a prior art call signal which comprises an ID (paging number) and a message, while FIG. 2B illustrates the format of a call signal for the paging receiver of the present invention which comprises a password in addition to an ID and a message, the password being of a numeral of four figures for example.

Below, operation of the present invention will be described with reference to FIGS. 1 and 3.

As understood from FIG. 1, a radio signal received through the antenna 1 is demodulated in the radio part 2. A paging signal involved in the demodulated data is collated with a paging number of itself stored in the ID-ROM 4 in the paging number collator portion 5, and if both numbers are coincident with each other, then a character-string involved in the received message is collated with a password stored in the password storage portion 6 in the password collator portion 7. If coincidence between both passwords is attained, the alarming portion 9 informs a user of that fact. The display portion 10 displays thereon the received message (telephone number of a calling party for example) at the same time of the alarming. If the coincidence is not attained, however, it is judged whether or not the alarming is prohibited, and the alarming portion 9 executes the alarming only when the alarming is not prohibited.

The control portion 3 judges whether or not the alarming is prohibited by comparing the present time clocked in the clock portion 12 with the initiation time of the alarming and the prohibition completion time of the same, both previously set. In the case where the alarming is not executed because of the alarming prohibition, the received message is stored in the message storage part 11, and the alarming is executed when the alarming prohibition is released.

The control portion 3 operates as illustrated in FIG. 3 when the message is received.

As measured from FIG. 3, it is judged in step S101 whether or not the password involved in the received message is coincident with the password stored in the password storage portion 6, and if there is coincidence between the two passwords, then the alarming part 9 informs a user of that fact by alarming and the message is displayed on the display portion 10 in step S102. In the case where there is no coincidence between the two password, it is Judged whether or not the present time is within the prohibition time zone of the alarming/display in step S103. If the present time is not within the prohibition time zone, the alarming and the message display are effected in step S104. In contrast, if the same is within the prohibition time zone, the alarming and the message display are not effected in step S105. In this case, the received message is once stored in the message storage portion 1 in step S106, and the alarming is effected after the completion of the prohibition time zone in step S107.

It is noticed that with the arrival of the commencement time and completion time of the prohibition time zone, a short time ringing sound different from ordinary alarm may be issued for the alarming.

According to the present invention, as described above, only in the case where a preset specific password is involved in a received message, alarming and display of a message are allowed, and when the specific password is different from a password inherent to a user, alarming and display of a message are only allowed outside a set proibition time zone while the alarming and the diaplay of the message are prohibited within the prohibition time zone. Accordingly, calling can be limited depending upon the time, and proper use of private and business calls is ensured for further convenient use of the paging receiver by carriers.

What is claimed is:

1. A paging receiver equipped with a display, said display being adapted to inform a user of a call with a ringing sound when a paging number contained in received data is coincident with a paging number allocated to the user and to display a received message, said paging receiver comprising:

means for setting a password inherent to the user;

a password comparator and collator means for comparing and collating a password contained in the received data with said password inherent to the user;

time setting means for setting times of commencement and completion of an alarming prohibition time zone; and alarming/display control means for permitting said display to execute alarming and display when said passwords are coincident with each other, permitting in the same manner said display to execute the alarming and display when said passwords are not coincident and when an operation time of the paging receiver is out of the prohibition time zone set by said time setting means, and prohibiting said display to execute the alarming and the display of a message when said passwords are not coincident and the operation time of the paging receiver is within the prohibition time zone.

2. A paging receiver according to claim 1 further comprising message storage means for storing a message received within said prohibition time zone and wherein said alarming/display control means automatically displays the message stored in said message storage means after the completion of the prohibition time zone.

3. A paging receiver according to claim 2 wherein said alarming/display means executes alarming after the completion of the prohibition time zone.

4. A paging receiver according to claim 1 wherein said password can be given by operating buttons on a panel of the paging receiver.

5. A paging receiver according to claim 1 wherein alarming is effected with a different tone during the prohibition time zone.

6. A paging receiver according to claim 1 wherein said password can be displayed on the display.

7. A paging receiver equipped with a display, said display being adapted to inform a user of a call with a ringing sound when a paging number contained in received data is coincident with a paging number allocated to the user and to displaying a received message, said paging receiver comprising:

a password storage means;

a password comparator and collator means for comparing and collating a password contained in the received data with a password stored in said password storage means;

time setting means for setting times of commencement and completion of an alarming prohibition time zone; and a prohibition time storage means for storing the times of commencement and completion of the prohibition time zone set by said time setting means;

a message storage means; and alarming/display control means for permitting said display to execute alarming and display when said passwords are coincident with each other, permitting in the same manner said display to execute the alarming and display when said passwords are not coincident and an operation time of the paging receiver is out of the prohibition time zone set by said setting means, and prohibiting said display to execute the alarming and the display of a message when said passwords are not coincident and the operation time of the paging receiver is within the prohibition time zone.

* * * * *